Feb. 15, 1927.

J. A. VILLAR 1,617,692

TIN FOR ANCHOVIES, SALT MEAT, AND PRESERVED FISH

Filed Oct. 17, 1924

Inventor:
José Alonso Villar
by Sheffield & Betts
his Attorneys.

Patented Feb. 15, 1927.

1,617,692

UNITED STATES PATENT OFFICE.

JOSÉ ALONSO VILLAR, OF VIGO, SPAIN.

TIN FOR ANCHOVIES, SALT MEAT, AND PRESERVED FISH.

Application filed October 17, 1924. Serial No. 744,202.

The present invention relates to improvements in receptacles for anchovies, salt meat and preserved fish. By the use of the term "receptacles" I include boxes, packing tins and other suitable containers for shipping the above-mentioned articles.

The tin to which the present invention relates has several advantages over others of its class hitherto known and does away with the old system of tin clasps or studs soldered onto the inside of the tin to hold in place the disk which presses the block of fish so as to leave the space necessary for the brine. The invention employs instead of the clasps or studs, a disk of tin or other suitable material of circular form and having means for maintaining the same at a predetermined depth below the top of the container.

When the receptacle is closed by means of a cover or lid placed thereon sufficient free space to hold a brine solution is provided between the disk and the cover.

Figure 1:
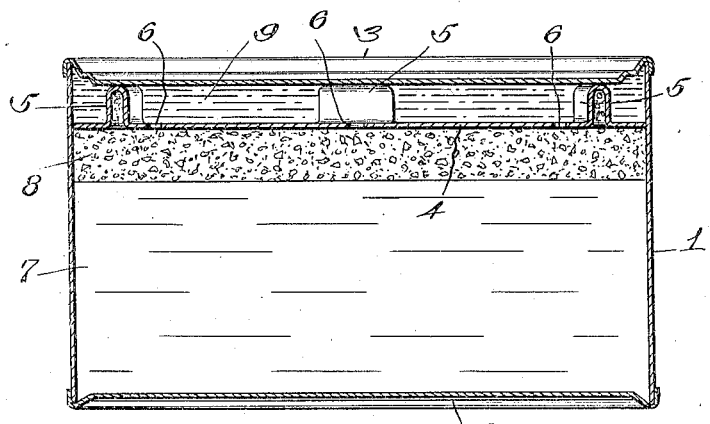

A detailed description of the form which I deem preferable is set forth in the following specification and the accompanying drawings forming a part thereof, in which, Fig. 1 is a vertical cross-section showing the relative positions of the disk and cover with respect to the body of the receptacle and its contents.

Figure 2:
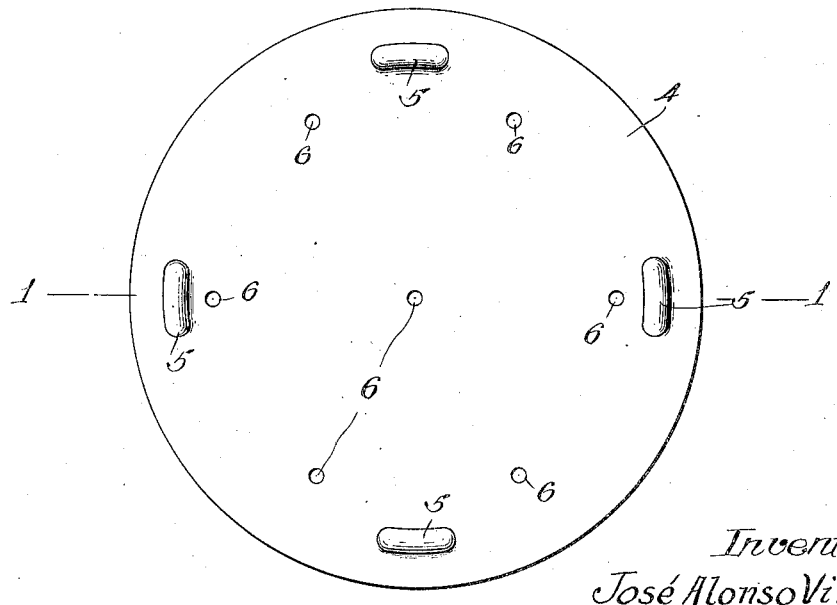

Fig. 2 is a plan view of the disk.

Referring to the drawings, the numerals 1 and 2 indicate the side or body and the bottom respectively of a receptacle to be used for shipping the preserved fish. A cover 3 is provided to seal the receptacle. This cover or lid is preferably provided with an inwardly-extending depression as shown. A disk 4 of tin or other suitable material is inserted within the receptacle to hold in place the contents thereof during shipment. The disk is provided with a plurality of raised portions 5 either attached to or formed integral with the disk and which are adapted to cooperate with the lower surface of the cover 3 to receive pressure therefrom. It is obvious that the number and shape of these raised portions may be varied as desired without departing from the spirit of my invention.

Sufficient free space is left between the disk 4 and cover 3 to form a chamber wherein a brine solution may be carried as indicated at 9. To allow access of the brine solution to the contents of the receptacle, the disk 4 is preferably perforated as shown at 6.

The manner of using my improved container may be described as follows:

The article to be shipped is placed in the receptacle and may be covered with a layer of salt as shown at 8. The disk 4 is next placed within the receptacle and in contact with the layer of salt, the receptacle being filled to such height with preserved fish or the like that the lower surface of the cover 3 is placed in contact with the tops of the raised portions 5 and pressure is applied to the cover 3 to force the same into position. A brine solution is first introduced into the chamber 9, and the cover 3 placed on the receptacle to close it. The receptacle is then sealed and the pressure of the cover will be transmitted through the disk 4 to the contents of the receptacle to hold the latter in place during shipment.

I do not wish to be limited to the details of construction shown since it will be readily understood that various equivalent changes may be made therein without departing from the spirit and scope of my invention.

Having now described my invention, what I claim is:

1. A shipping container for edible materials, comprising in combination, a box made of sheet metal, a sealed lid, a disk within said box adapted to bear upon said materials and providing a fluid chamber between the same and said lid, and spacing means between said lid and disk whereby substantial pressure may be transmitted from said lid through the said disk to the contents of the container.

2. A shipping container for edible materials, comprising in combination, a box made of sheet metal, a sealed lid, a disk within said box adapted to bear upon said materials and providing a fluid chamber between the same and said lid and having a plurality of raised portions formed thereon adapted to engage said lid whereby substantial pressure may be transmitted from the lid thru the said disk to the contents of the container.

3. A shipping container for edible materials, comprising in combination, a box made of sheet metal, a sealed lid, a disk within said box adapted to bear upon said materials and acting in conjunction with the side of the box to provide a brine chamber between the disk and said lid and having a plurality of raised portions formed thereon adapted to engage said lid whereby substantial pressure may be transmitted from the lid thru the said disk to the contents of the container, said disk having passages whereby the brine may have access to said contents.

In testimony whereof he has signed his name to this specification.

JOSÉ ALONSO VILLAR.